United States Patent
Stilwell et al.

(10) Patent No.: US 11,661,060 B1
(45) Date of Patent: May 30, 2023

(54) DIRECTION-OF-TRAVEL-BASED INHIBITION OF SPEED CONTROL BASED ON TRUCK-TO-TRUCK PROXIMITY DETECTION

(71) Applicant: Hyster-Yale Group, Inc., Fairview, OR (US)

(72) Inventors: Edmund Stilwell, Oregon City, OR (US); Ryan McDermott, Fairview, OR (US); Nicholas M. Draayer, Happy Valley, OR (US)

(73) Assignee: Hyster-Yale Group, Inc., Fairview, OR (US)

( * ) Notice: Subject to any disclaimer, the term of this patent is extended or adjusted under 35 U.S.C. 154(b) by 0 days.

(21) Appl. No.: 17/858,824

(22) Filed: Jul. 6, 2022

(51) Int. Cl.
*B60W 30/14* (2006.01)
*B65G 1/137* (2006.01)

(52) U.S. Cl.
CPC ......... *B60W 30/146* (2013.01); *B65G 1/1375* (2013.01); *B60W 2520/06* (2013.01); *B60W 2554/802* (2020.02); *B60W 2720/10* (2013.01)

(58) Field of Classification Search
CPC .. B60W 30/146; B60W 30/16; B60W 30/162; B60W 2520/06; B60W 2554/80; B60W 2720/10
See application file for complete search history.

(56) References Cited

U.S. PATENT DOCUMENTS

| | | | |
|---|---|---|---|
| 8,346,468 B2 | 1/2013 | Emanuel et al. | |
| 9,043,131 B2 | 5/2015 | Carlson et al. | |
| 9,481,300 B1 | 11/2016 | Lutawan | |
| 10,399,495 B1 | 9/2019 | Osborne | |
| 2011/0178657 A1 | 7/2011 | Harasaki | |
| 2014/0180563 A1 | 6/2014 | Simon | |
| 2015/0321562 A1* | 11/2015 | Nomura | B60L 3/0046 701/22 |
| 2018/0143312 A1* | 5/2018 | High | H04W 4/33 |
| 2020/0311964 A1* | 10/2020 | Ishizaki | G06T 7/50 |
| 2021/0101595 A1* | 4/2021 | Cheyne | G05D 1/0214 |
| 2021/0263520 A1 | 8/2021 | Bröring et al. | |
| 2021/0278863 A1 | 9/2021 | Luthe et al. | |

FOREIGN PATENT DOCUMENTS

| | | |
|---|---|---|
| EP | 3118152 A1 | 1/2017 |
| WO | WO-2022004494 A1 * | 1/2022 |

OTHER PUBLICATIONS

English Translation of WO 2022004494 A1 (Year: 2022).*

* cited by examiner

*Primary Examiner* — Anshul Sood
(74) *Attorney, Agent, or Firm* — Laurence & Phillips IP Law

(57) ABSTRACT

A proximity-detection and speed-control system for a materials-handling vehicle, such as a lift truck, is provided with a recommended direction of travel for the vehicle. A proximity sensor is provided to determine the vehicle's proximity to a restricted member, such as another vehicle, a high-value object, a dangerous location, or a pedestrian. If the vehicle is traveling in the recommended direction of travel, the speed control function is disabled. If, however, the vehicle is not travelling in the recommended direction and the proximity sensor indicates the vehicle is within a restricted distance of the restricted member, the speed control function is triggered to restrict the maximum speed of travel of the vehicle and to slow the vehicle if needed.

30 Claims, 11 Drawing Sheets

DIRECTION-OF-TRAVEL-BASED INHIBITION OF SPEED CONTROL BASED ON TRUCK-TO-TRUCK PROXIMITY DETECTION

TECHNICAL FIELD

This disclosure relates generally to methods and mechanisms for sensing and responding to vehicle proximity and to implementing a slow-down function for materials-handling vehicles determined to be in close proximity to each other or other speed-restricting people, objects, or features.

BACKGROUND INFORMATION

Operator assist systems (OAS) in materials-handling vehicles, such as lift trucks, can include proximity detection and slow-down systems. Proximity detection and slow-down systems have been implemented in lift trucks, for example, to slow down the vehicles whenever two or more trucks are within a predetermined distance of each other as determined using ultra-wideband (UWB) radio frequency sensors. This is referred to as "truck-to-truck" or "T2T" slow-down. The T2T slow-down feature causes trucks within close proximity of each other to slow down regardless of direction of travel and regardless of the likelihood or unlikelihood of a collision between the vehicles.

While UWB provides a reliable and inexpensive mechanism for determining proximity between primary and secondary sensors, it also has significant limitations. Firstly, simple UWB systems (e.g., single antennae) can only sense distance, not direction, between sensors and only have a detection range of approximately 0-25 meters. Implementing directionality using UWB requires a much more advanced and expensive system. Furthermore, UWB systems may have a limited sampling frequency that restricts the ability to be used for determining accurate and complete velocity profiles. In addition, "proximity" using UWB is determined in an open "3D" environment and cannot determine vehicle travel direction, whether vehicles are on different vertical levels, or if other obstacles such as shelving or other objects are arranged between vehicles and would prevent collisions.

Referring to FIGS. 1A and 1B, a conventional lift truck 100a having a T2T slow-down function slows down by restricting the maximum operating speed of the truck 100a when another truck 100b is determined to be in close proximity to it. This can be done, for instance, utilizing UWB radio frequency sensors to determine the relative distance between the trucks 100a, 100b, 100c and then using the vehicle's regen system to slow (indicated by horizontal cross-hatching) the truck 100a down as a function of proximity to another truck 100b. Distance, speed, and stability issues may all be taken into account in slowing the vehicle 100a. Utilizing the conventional T2T slow-down system, the other lift truck 100b in close proximity to the first truck 100a is also slowed. A third vehicle 100c is not slowed (represented by vertical cross-hatching) because it is not close enough to either of the other trucks 100a, 100b.

The vehicle slow-down occurs regardless of the direction of travel of the lift trucks 100a, 100b determined to be too close to each other. In other words, the conventional system for T2T slow-down will slow a lift truck 100a, 100b regardless of whether it is travelling in a recommended direction of travel (e.g., trailing forks 210) (indicated by the letter "R") or in the opposite direction (e.g., leading forks 210) (indicated by the letter "N"). This can result in vehicle slow-downs, and therefore productivity losses, when there is never any real danger of a collision between trucks 100a, 100b. Unfortunately, therefore, this conventional system, while successful in helping an operator to avoid collisions, can significantly reduce productivity by causing vehicle slow-downs in situations where collisions between vehicles are unlikely to occur. And systems that can determine directionality, while helpful in increasing productivity, are much more expensive to implement.

OVERVIEW OF DISCLOSURE

Balancing productivity and collision avoidance is a primary concern in the operation of lift trucks. The principles and concepts described herein provide a truck-proximity detection and speed-control system that is inexpensive to implement and can significantly increase productivity without sacrificing collision avoidance. One embodiment utilizes both proximity detection and readily available information regarding a vehicle's direction of travel to determine whether or not to slow the vehicle down when close to a restricted item, such as another vehicle, pedestrian, high-value object, or high-traffic location (e.g., a crosswalk, intersection, or pedestrian walk-way).

One example embodiment can include a UWB sensor or any other relative or absolute location/distance sensor (e.g., radar, ultrasonic, stereo camera, laser rangefinder, infrared, or electromagnetic) (herein, a "proximity sensor") and an operator assist system (OAS) controller that communicates with a truck controller arranged in the lift truck, for instance, using the controller area network (CAN) specification. A proximity sensor can be any device that can detect a relative distance between itself and something else. The proximity sensor communicates with the OAS controller to determine when the truck is in close proximity to another truck, object, pedestrian, or restricted location (each, a "restricted item"). A restricted item could be anything that the customer might want to automatically slow the truck down for when it is near that item. The truck controller identifies a direction of travel of the lift truck and communicates that information to the OAS controller. The OAS controller compares the truck travel direction with a predetermined recommended direction selected by the customer and programmed into the OAS controller.

The customer can, for example, select a recommended direction of travel based on a truck type, a load condition, an operating environment, a load type, a mast height, or any other environmental or truck conditions. The recommended direction of travel is typically the preferred direction to operate the vehicle and other directions are undesirable based on the customer's training and experience. Furthermore, the recommended direction of travel can be location based and/or determined on a truck-by-truck basis and updated in real-time during operation of the truck based on any desired factors.

If the OAS controller determines that the truck is travelling in the recommended direction, the automatic slow-down function is disabled. If, however, the OAS controller determines that the truck is not travelling in the recommended direction, the automatic slow-down function is not disabled and, if the truck is determined to be in close proximity to another truck or restricted object or location, the automatic slow-down function is activated and the OAS controller communicates with the truck controller to set a maximum speed and slow the vehicle down if it exceeds that maximum speed. More specifically, as in the conventional system, UWB radio frequency sensors can be used to determine 2D proximity between T2T-equipped vehicles. For vehicle use, travel is generally confined to 2D movements over a surface, therefore the UWB technology will be described here as operating in 2D. However, UWB detects objects in a 3D environment and in some embodiments such 3D detection may be used. Other vehicles, trucks, pedestrians, objects, or locations can also be provided with UWB tags to indicate their distance or proximity to a T2T-equipped truck. According to principles of the concepts disclosed herein, however, in addition to the 2D UWB proximity sensors arranged in the trucks, a vehicle also uses information regarding its own direction of travel to determine whether or not to implement the slow-down function.

According to one preferred aspect, a customer can determine a preferred or recommended direction of travel for T2T-equipped vehicles in its facility. The recommended direction of travel can be determined by the customer on a case-by-case basis, such as for a particular facility, one or more specific locations within the facility, and/or for individual trucks. The recommended direction of travel can further be selected and/or modified based on truck conditions, such as load conditions, mast conditions, speed, etc. Information regarding the recommended direction of travel can further be updated in real-time based on customer desires. In one embodiment, the recommended direction of travel can, for instance, be either a fork-leading or a fork-trailing direction.

In one specific embodiment, a recommended direction is the forks 210 trailing direction. If a vehicle is travelling in the recommended direction (e.g., forks 210 trailing), the automatic slow-down function is disabled and the truck is not slowed even if it is within a restricted predetermined distance of another truck (or other speed restricting object or location). However, if the truck is not travelling in the recommended direction (e.g., is travelling with the forks 210 leading), the automatic slow-down function remains enabled and, when the proximity sensors determine that the truck is within the predetermined distance of another vehicle (or other speed restricting object or location), the automatic slow-down system slows the vehicle down to help an operator prevent a collision.

In other words, the proximity-detection and speed-control system according to some of the present inventive principles would only slow down a T2T-equipped truck if it is both being driven in the non-recommended direction and it's near another T2T-equipped truck or tagged person, object, or location. The system would not slow down a truck that is driving in the recommended direction even if it is near another sensed vehicle, object, or location and would not slow down a truck driving in the non-recommended direction that is not within a restricted distance of another speed-restricting feature.

In other embodiments, steer direction (e.g., whether a vehicle is travelling straight or turning, mast height (e.g., whether the forks 210 are raised/lowered and by how much), a load condition, or other factors could be used to determine whether or not to disable the proximity-detection slow down function of the lift truck. For instance, if a truck is travelling straight, regardless of the direction of travel, the slow-down function could be disabled. Alternatively, if the forks 210 are lowered, regardless of the direction of travel, the slow-down function could be disabled. Or if the truck is unloaded, the slow-down function could be disabled regardless of the direction of travel.

In still other embodiments, the slow-down function could be maintained if other predetermined conditions are satisfied. For example, if the truck is determined to be in close proximity to a predetermined number of restricted items (such as multiple vehicles or pedestrians, for example), the slow-down function could be maintained regardless of whether the vehicle is travelling in a recommended direction. The predetermined number could be selected and updated based on customer needs or concerns. Or the system could be configured to maintain the automatic slow-down function whenever a pedestrian (or any other user-selected restricted item) is in close proximity.

Various aspects, embodiments, and configurations of the principles and concepts described herein are possible without departing from the principles disclosed herein. The inventive concepts are therefore not limited to any of the particular aspects, embodiments, or configurations shown or described herein. In addition, various features, benefits, and configurations incorporating the principles and concepts described and illustrated herein will be readily apparent to those of ordinary skill in the art based on this disclosure, and all such features, benefits and configurations are considered within the scope of the present invention.

Among other things, it should be apparent that the proximity detection and slow-down system could be used on vehicles and other moving devices besides lift trucks. Furthermore, the system can be configured as a retrofit or original equipment for a lift truck or other vehicle or device. In addition, a Real-Time Locating System (RTLS) or other location-sensing system or systems could be used to identify truck locations and determine proximity between vehicles, pedestrians, and other speed restricting objects in addition to, or instead of, the UWB equipment and sensors.

Additional aspects and advantages will be apparent from the following detailed description of example embodiments, which proceeds with reference to the accompanying drawings.

BRIEF DESCRIPTION OF THE DRAWINGS

The foregoing and additional objects, features, and advantages of the present inventive concepts will become more readily apparent from the following detailed description of preferred embodiments, depicted in the attached drawings, in which.

DETAILED DESCRIPTION OF EMBODIMENTS

Figure 1A:
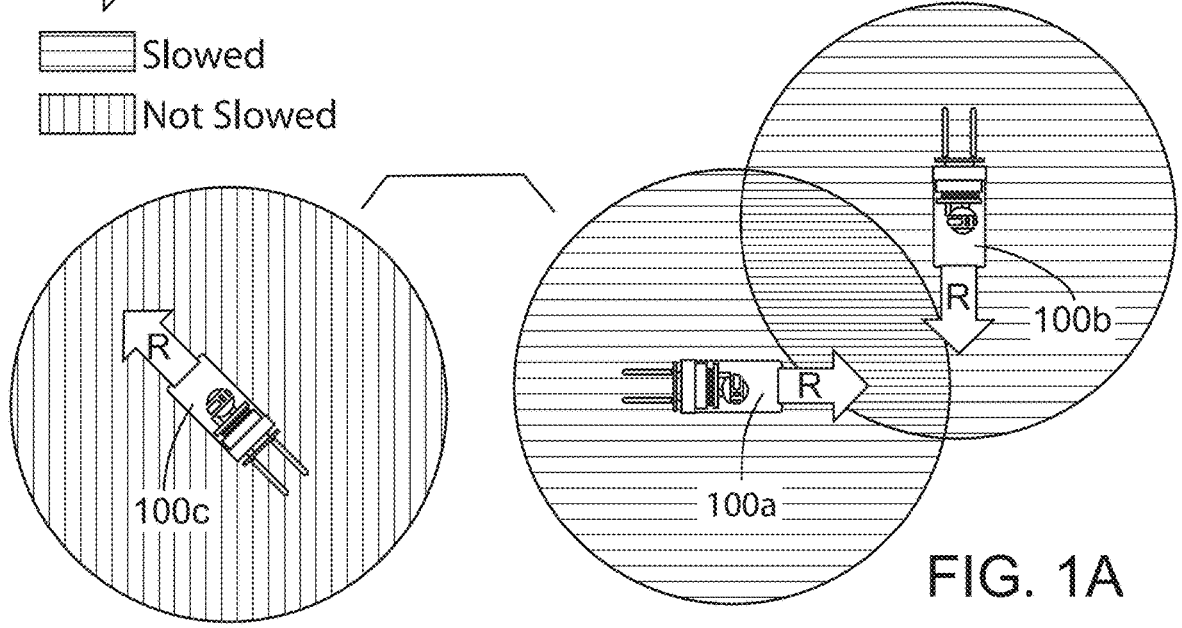
FIG. 1A is a schematic illustration of trucks driving in a 2D open environment according to a conventional system for proximity detection slow-down in T2T-equipped lift trucks.

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete and will convey the scope of the disclosure to those skilled in the art.

Figure 1B:
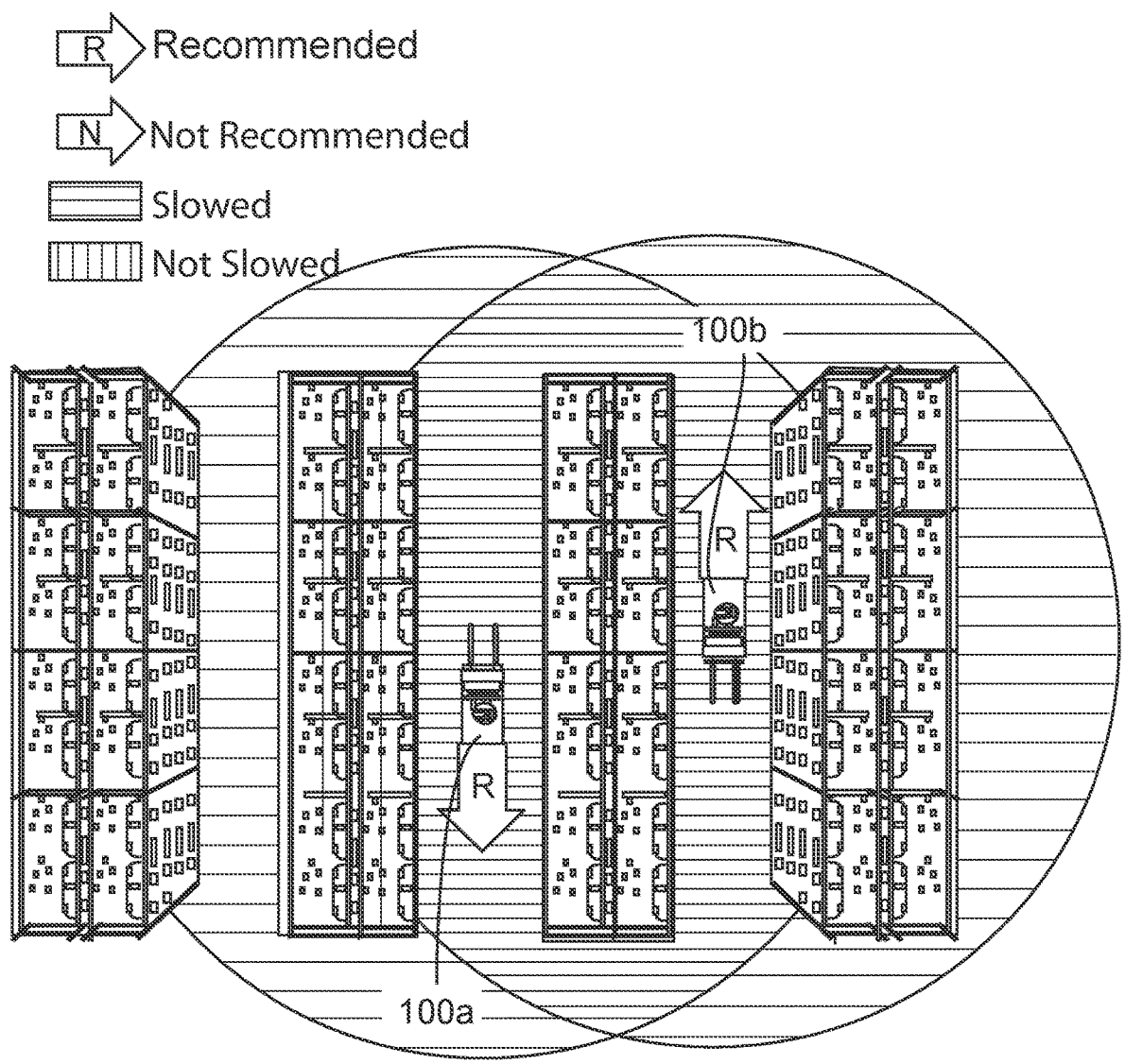
FIG. 1B is a schematic illustration of trucks driving in a warehouse environment according to additional features of a conventional system for proximity detection slow-down in T2T-equipped lift trucks.

As explained above, balancing productivity and collision avoidance is a primary concern in the operation of lift trucks. Conventional systems prioritize collision avoidance at a significant cost to productivity. As shown in FIGS. 1A and 1B, for example, even though both trucks 100a, 100b are travelling in the recommended direction (as indicated by the letter "R"), the proximity detection slow-down feature slows both trucks 100a and 100b (as indicated by the horizontal cross-hatching). A third truck 100c travelling in the recommended direction is not slowed (indicated by the vertical cross-hatching) because it is not in close enough proximity to the other trucks 100a and 100b to trigger the proximity detection slow-down feature.

Unfortunately, this conventional system, while successful in helping to avoid collisions, can reduce productivity by causing vehicle slow-downs in situations where collisions between vehicles are unlikely to occur or impossible. Referring specifically to FIG. 1B, for example, trucks 100a, 100b travelling in their preferred directions down adjacent aisles may both be slowed even though there is no real possibility of a collision between the trucks 100a, 100b.

The truck proximity-detection and speed-control system according to principles of the present inventive concepts is both inexpensive to implement and can significantly increase productivity without unduly sacrificing collision avoidance. As explained in further detail below, a preferred embodiment utilizes both proximity detection and readily available information regarding a vehicle's direction of travel to determine whether or not to slow the vehicle down when close to a restricted item (e.g., another vehicle, pedestrian, high-value object, or high-traffic location (e.g., a crosswalk, intersection, or pedestrian walk-way)).

FIGS. 2-7 illustrate operation of a proximity detection slow-down function according to principles of the present inventive concepts. Specifically, referring to FIGS. 2-7, as in the conventional system, UWB radio frequency emitters are provided on lift trucks 200a, 200b, 200c, pedestrians 300, restricted travel zones 400, and other restricted objects or locations. These UWB emitters provide a zone around a vehicle or other tagged person, object, or location that identifies its location to a T2T-equipped truck. This zone is represented by circles 210, 210a, 210b, 310, and 410. UWB emitters can, for instance, be provided by UWB tags or other emitters, such as pedestrian tags and vehicle products available from Litum Technologies, Inc. UWB sensors arranged in the T2T-equipped trucks can then be used to determine proximity between the T2T-equipped vehicles and other vehicles, trucks, pedestrians, objects, or locations that are equipped with UWB emitters.

In addition to the conventional UWB emitters and sensors, however, a T2T-equipped vehicle according to principles of the present inventive concepts also uses information regarding its own direction of travel to determine whether or not to implement the slow-down function. According to one preferred aspect, a customer can determine a preferred or recommended direction of travel for T2T-equipped vehicles in its facility. The recommended direction of travel can be determined by the customer on a case-by-case basis, such as for a particular facility, one or more specific locations within the facility, for individual trucks, or even based on truck conditions. Information regarding the recommended direction of travel can further be updated in real-time based on customer desires. The recommended direction of travel can, for instance, be either a fork-leading or a fork-trailing direction. In the embodiments shown, the selected recommended direction of travel is the fork trailing direction.

According to the inventive principles, if a vehicle is travelling in a recommended direction (e.g., forks 210 trailing), the automatic slow-down function is disabled and the T2T-equipped truck 200a, 200b, 200c is not slowed even if it is within a restricted predetermined distance of another truck (or other speed restricting object or location). However, if the truck 200a, 200b, 200c is not travelling in the recommended direction (e.g., is travelling with the forks 210 leading), the automatic slow-down function remains enabled and when the proximity sensors determine that the truck 200a, 200b, 200c is within the predetermined distance of another vehicle (or other speed restricting object or location), the automatic slow-down system slows the vehicle down to help prevent a collision.

In other words, the proximity-detection and speed-control system according to present inventive principles would only slow down a T2T-equipped truck if it's both being driven in the non-recommended direction and it is near another T2T-equipped truck or tagged person, object, or location. The system would not slow down a truck that is driving in the recommended direction even if it is near another sensed vehicle, object, or location and would not slow down a truck driving in the non-recommended direction that is not within a restricted distance of another speed restricting feature.

Figure 2:
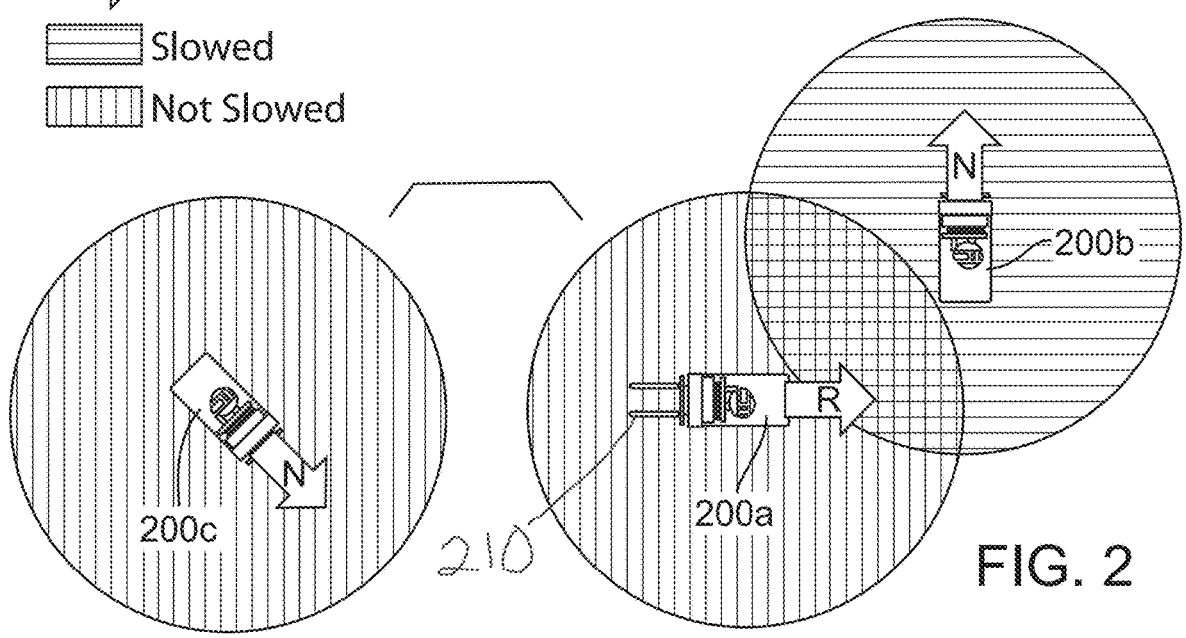
FIG. 2 is a schematic illustration of T2T-equipped trucks driving in an 2D open environment according to one embodiment of the present invention.
Figure 3A:
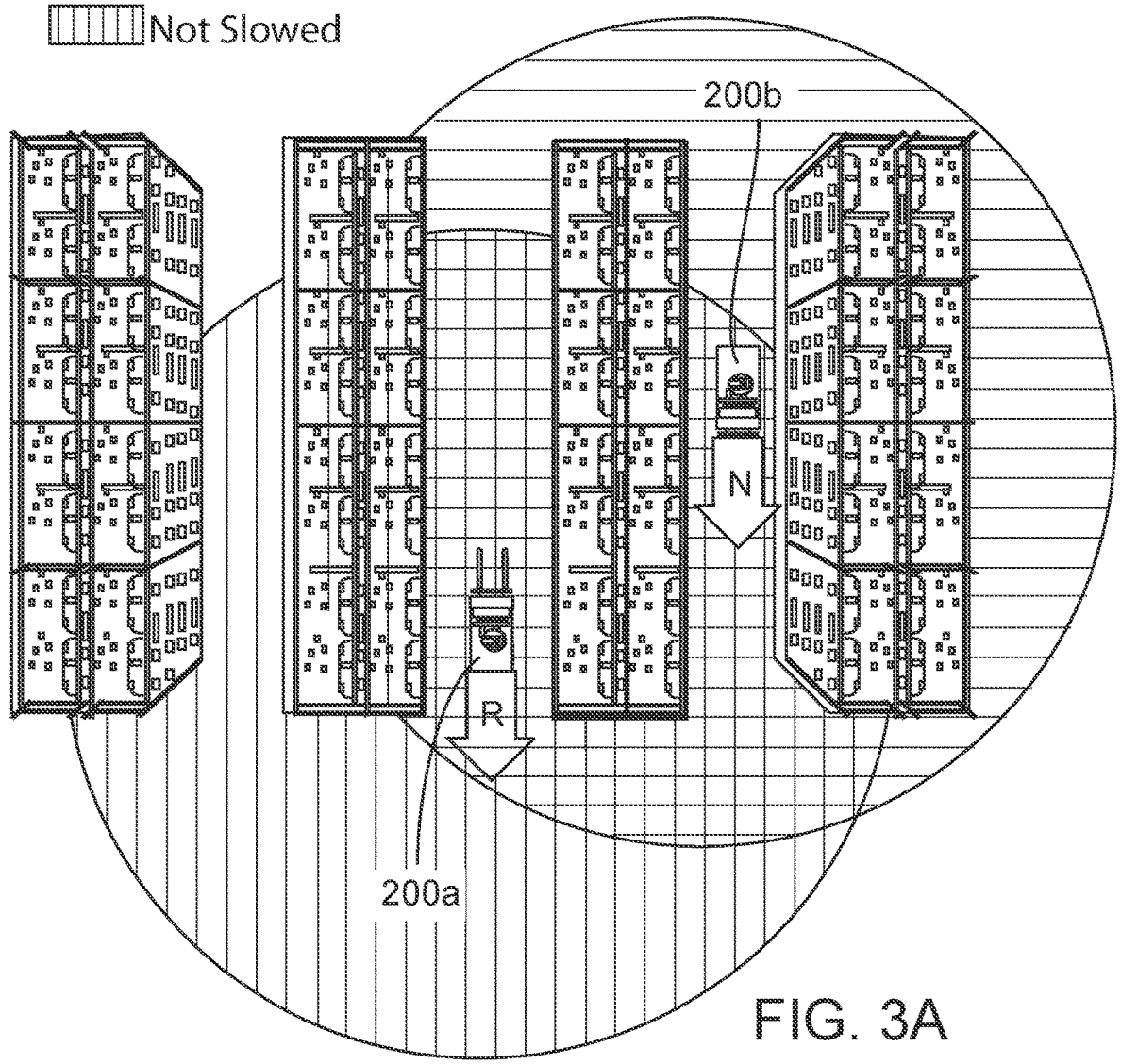
FIG. 3A is a schematic illustration of T2T-equipped trucks driving in a warehouse environment according to one embodiment of the present invention.
Figure 3B:
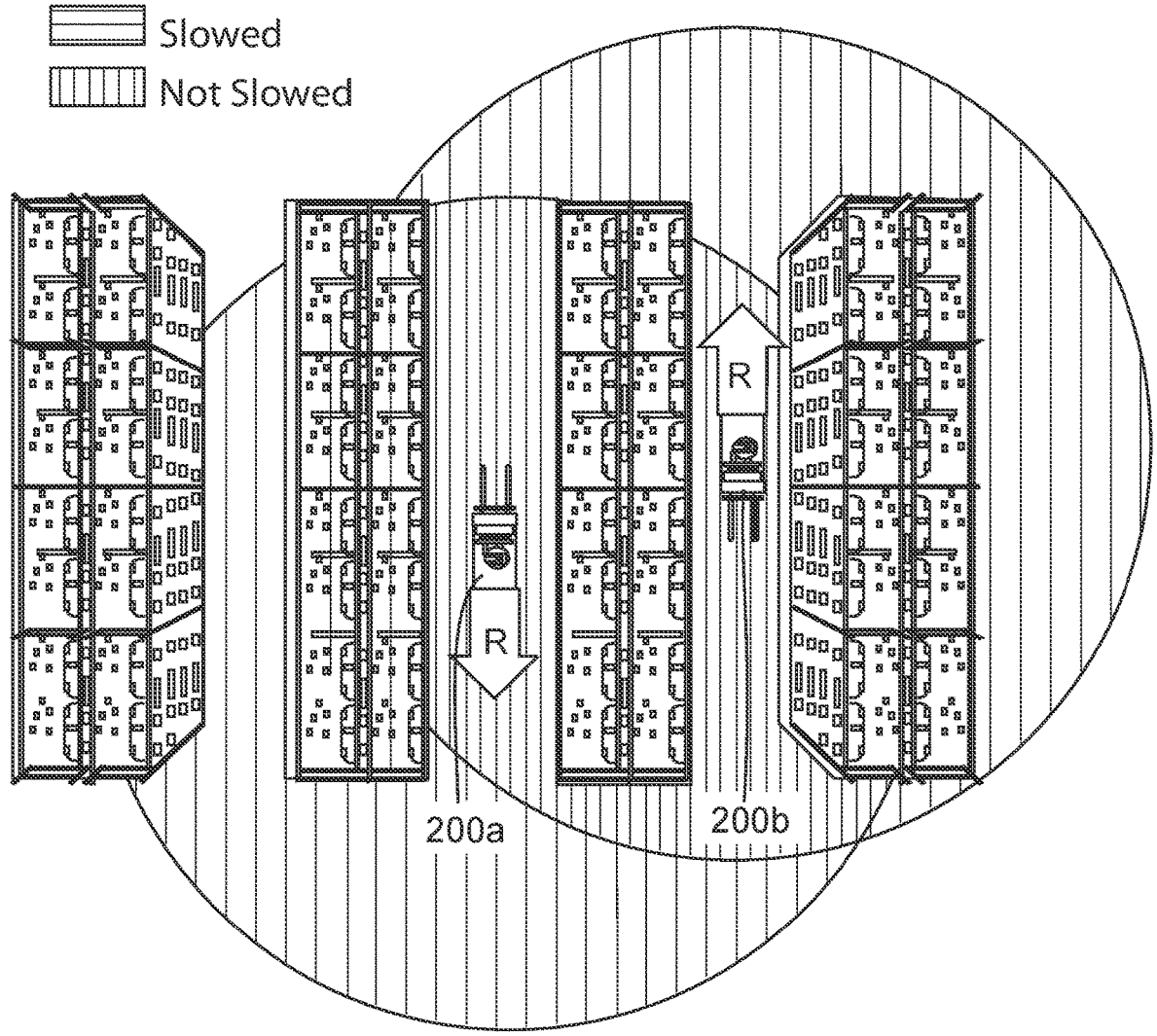
FIG. 3B is a schematic illustration of T2T-equipped trucks driving in a warehouse environment according to one embodiment of the present invention.

Referring specifically to FIGS. 2-3B, the principles and concepts described herein provide a truck proximity-detection and speed-control system that utilizes both proximity detection and information regarding a vehicle's direction of travel to determine whether or not to slow the vehicle down.

More particularly, in addition to the 2D proximity sensors arranged in the trucks 200a, 200b, 200c, the trucks 200a, 200b, 200c also use information regarding their direction of travel in relationship to a predetermined recommended direction of travel. The vehicle's existing systems can be used to determine whether the vehicle 200a, 200b, 200c is travelling in a recommended direction (e.g., forks 210 trailing). If the vehicle 200a, 200b, 200c is travelling in the recommended direction (letter "R"), the automatic slow-down function is disabled and the truck 200a, 200b, 200c is not slowed (vertical cross-hatching) even if it is determined to be within the predetermined distance of another truck 200a, 200b, 200c. However, if the truck 200a, 200b, 200c is not travelling in the recommended direction (e.g., is travelling with the forks 210 leading (indicated by the letter "N")), the automatic slow-down function remains enabled and when the proximity sensors indicate that the truck 200a, 200b, 200c is within the predetermined distance of another vehicle 200a, 200b, 200c, the automatic slow-down system slows the vehicle down (indicated by horizontal cross-hatching) to reduce the possibility of a collision.

The automatic slow-down feature can, for instance, be implemented using the vehicle's regen function (for electric vehicles) or other vehicle controls (friction brakes, transmission, coast control, etc.) to limit a maximum speed of the truck 200a, 200b, 200c and slow the vehicle down if it is exceeding the maximum speed. Information regarding the truck speed, the fork load, the fork height, the distance to the restricted object or feature, and any other desired information can be used to control the rate of the slow down and ensure truck stability during the automatic slow down.

In other embodiments, an RTLS could supplement or replace the UWB emitters and sensors to determine proximity between vehicles, pedestrians, and other objects or locations. In a still further embodiment, one or more additional sensors, such as LIDAR or other sensors could also be used to supplement or supplant the information obtained from 2D proximity sensors, and to make a more informed decision on whether or not to slow the vehicle down. The information from other sensors could also be used to determine how much and how quickly to slow the vehicle down. Furthermore, any type of proximity sensor could be used to make the proximity determination.

To increase productivity, the proximity-detection and speed-control system of the present inventive principles would only slow down a truck 200a, 200b, 200c if it is both being driven in the non-recommended direction (letter "N") and it is near another truck 200a, 200b, 200c. The system would not slow down a truck 200a, 200b, 200c that is driving in the recommended direction (letter "R") even if it is near another truck 200a, 200b, 200c and would not slow down a truck 200a, 200b, 200c driving in the non-recommended direction (letter "N") that is not near another truck 200a, 200b, 200c, or other suitable restricted object or location. The trade-off between collision avoidance and productivity is balanced by allowing trucks to operate without interference from the T2T system when the driver is operating the vehicle in the recommended direction. Only when the vehicle is being operated in the non-recommended direction would the T2T system intervene to slow the vehicle down in proximity to restricted objects or locations.

However, the system could identify areas, zones, high-priority assets or other features (such as pedestrians) that require slow-down of all vehicles regardless of recommended or non-recommended travel direction. In these areas, the T2T slow-down system could remain active regardless of a direction of travel of the vehicle. Alternatively, or additionally, the T2T slow-down system may slow a vehicle traveling in the recommended direction if a predetermined number of trucks or other restricted items are nearby. For example, a truck traveling in the recommended direction may not be slowed by the T2T system if one or two restricted items are nearby, but may be slowed if three or more restricted items are nearby.

Figure 4:
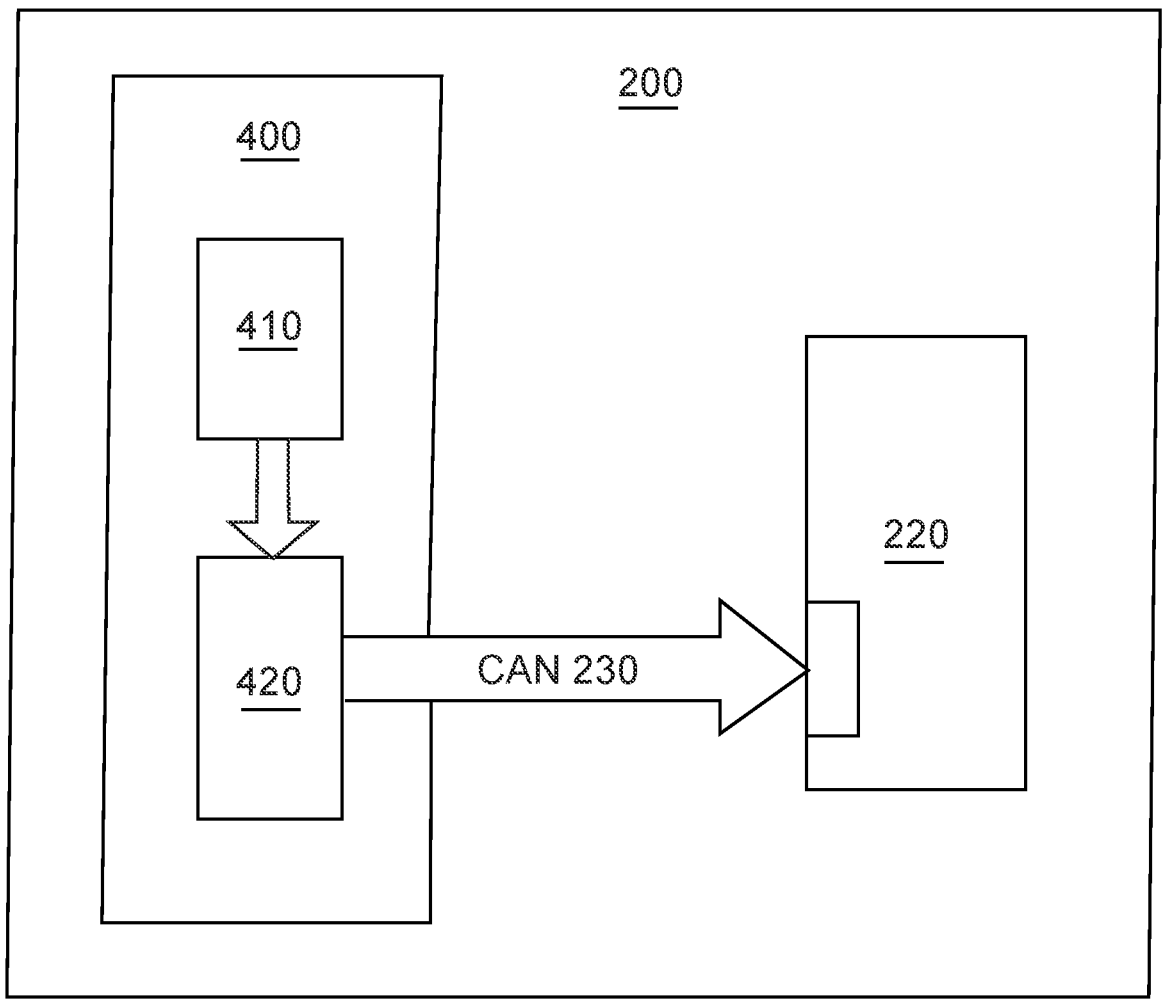
FIG. 4 is a schematic block diagram of a proximity detection and slow-down system for lift trucks according to one embodiment of the present invention.

FIG. 4 is a schematic block diagram illustrating a proximity-detection and slow-down system 400 for a lift truck 200 according to principles of the present inventive concepts. Referring additionally to FIG. 4, a proximity sensor 410 and an OAS controller 420 are provided. The OAS controller 420 communicates with a truck controller 220 arranged in the lift truck 200, for instance, using the CAN specification. The location sensor 410 communicates with the OAS controller 420 to signal when the truck is in close proximity to another truck, object, pedestrian or restricted location (e.g., a "restricted item"). The truck controller 220 identifies a direction of travel of the lift truck and communicates that information to the OAS controller 420. The OAS controller 420 compares the truck travel direction with a predetermined recommended direction selected by the customer. If the OAS controller 420 determines that the truck 200 is travelling in the recommended direction, the automatic slow-down function is disabled. If, however, the OAS controller 420 determines that the truck 200 is not travelling in the recommended direction, the automatic slow-down function is not disabled and, if the truck 200 is determined to be in close proximity to another truck or restricted object or location using the sensor 410, the automatic slow-down function is activated and the OAS controller 420 communicates with the truck controller 220 to set a maximum speed and slow the vehicle 200 down if it exceeds that maximum speed. Speed control can be accomplished, for example, using a regen system of the electric vehicle 200. Alternatively, or in addition, speed control could be accomplished using friction brakes, down-shifting the vehicle's transmission, coasting down, or any other method of slowing the vehicle.

In one embodiment, a proximity detection and slow-down system 400 for a lift truck 200 includes a UWB sensor 410 and a controller 420, such as those available through Litum Technologies, Inc. The controller 420 can communicate with a truck controller 220 in the lift truck 200 through the truck's controller area network (CAN) bus 230. In operation, the controller 420 can receive information from the truck's controller 220 regarding the vehicle's direction of travel. The system controller 420 can also receive information from the UWB sensor 410 regarding whether any UWB equipped vehicles, objects, pedestrians, or other tagged objects or locations are within a restricted distance of the vehicle 200. If the vehicle 200 is travelling in a non-recommended direction and the UWB sensor 410 indicates a tagged object or vehicle is within the restricted distance, the controller 420 communicates with the truck controller 220 through the CAN bus 230 to set a maximum speed and slow the truck 200 down if it exceeds the maximum speed.

Figure 5:
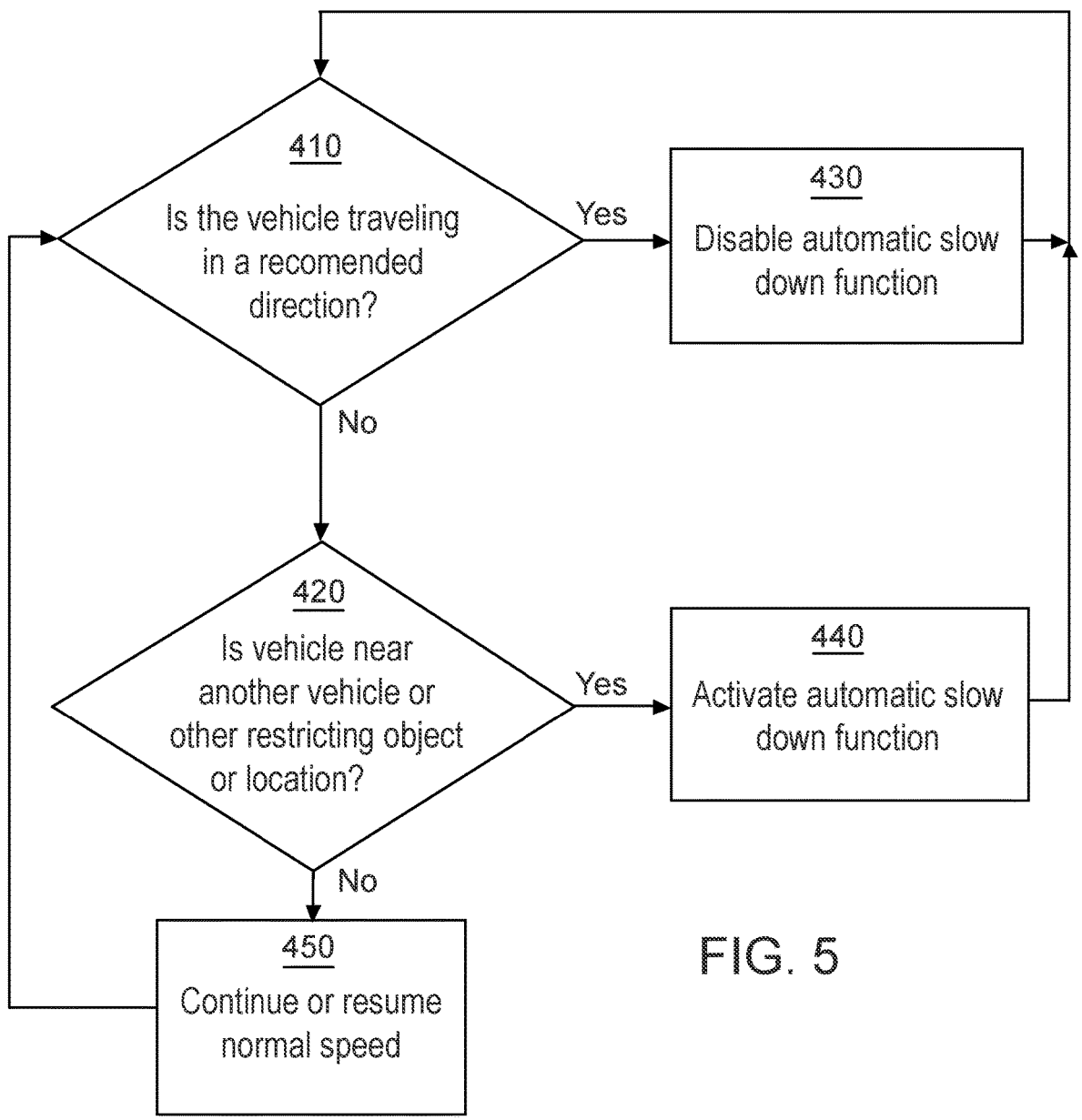
FIG. 5 is a flow chart illustrating a method of determining whether to initiate a slow down operation in a proximity detection and slow-down system according to one embodiment of the present invention.

FIG. 5 is a flowchart illustrating a method for determining whether to slow down a vehicle using the proximity-detection and speed-control system of the present inventive concepts. Referring additionally to FIG. 4, the method determines in a first step 410 whether the vehicle 200*a*, 200*b*, 200*c* is travelling in a recommended direction. This can be determined, for example, using the vehicle's existing equipment, for example, a signal from a forward, neutral, reverse selector. If the vehicle 200*a*, 200*b*, 200*c* is travelling in the recommended direction, the automatic slow-down function is disabled in another step 430 and the vehicle 200*a*, 200*b*, 200*c* will not be slowed regardless of its proximity to another vehicle 200*a*, 200*b*, 200*c* (or other restricted item). However, if the vehicle 200*a*, 200*b*, 200*c* is not travelling in the recommended direction, a second step 420 determines if the vehicle 200*a*, 200*b*, 200*c* is near another vehicle 200*a*, 200*b*, 200*c* (or other restricted item). This can be accomplished using the proximity sensors described previously to determine if the vehicle is within a predetermined restricted distance of another vehicle (or other restricted item). If the vehicle is not travelling in the recommended direction and the vehicle is near another vehicle (or other restricted item), the automatic slow-down function is activated in step 440 and the vehicle is slowed. In step 450, if, however, the vehicle is not near another vehicle (or other restricted item), the vehicle continues at normal speed, or, if it had been previously slowed due to proximity to another vehicle (or other restricted item), it resumes normal speed as soon as it is no longer within the restricted proximity.

Figure 6:
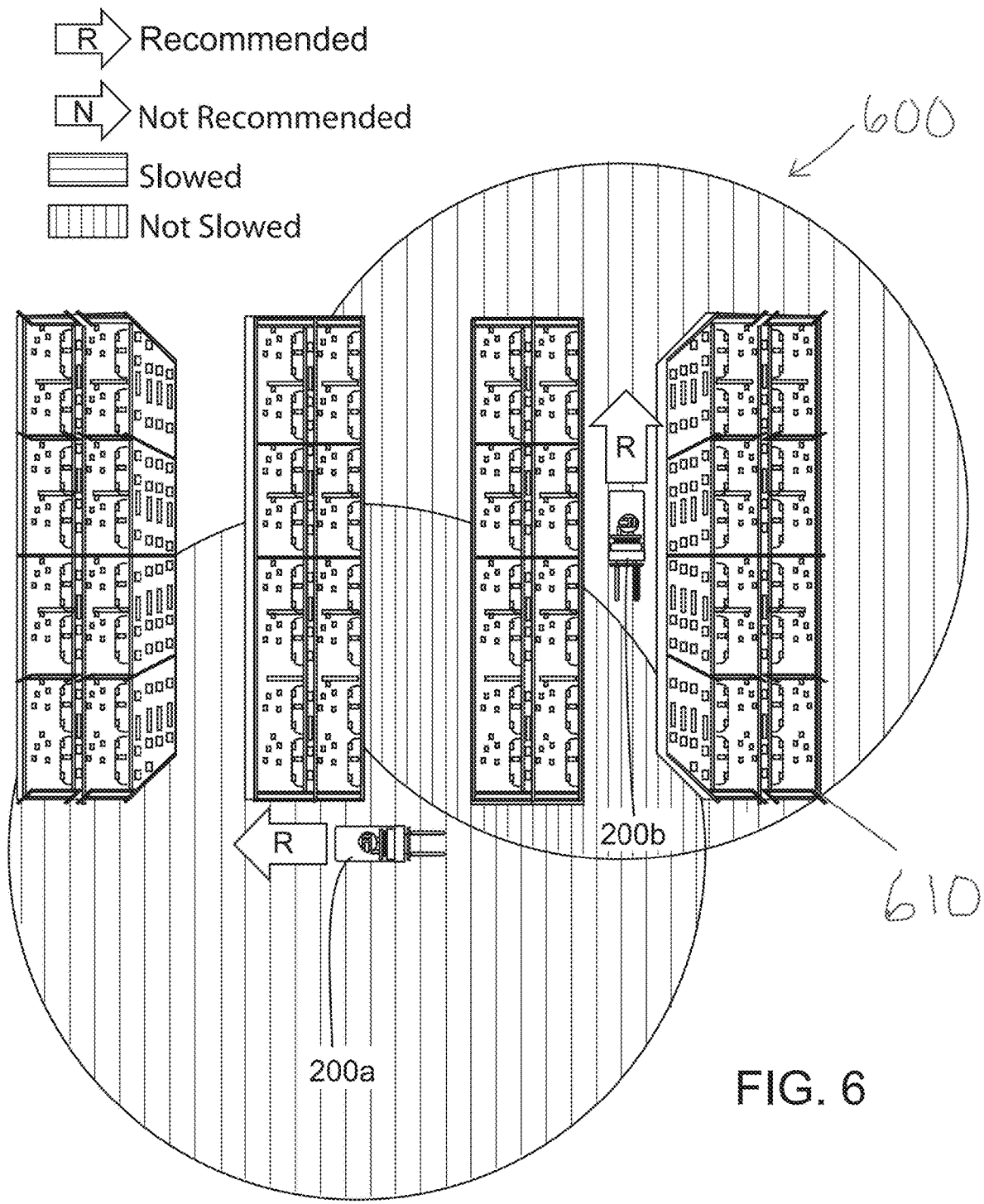
FIG. 6 is a schematic illustration of T2T-equipped trucks driving in a warehouse environment according to one embodiment of the present invention.

FIG. 6 is a schematic illustration of T2T-equipped trucks 200*a* and 200*b* driving in a warehouse environment 600 according to still further principles of the present inventive concepts. The two T2T-equipped trucks 200*a* and 200*b* using a proximity detection and slow-down system according to principles of the present inventive concepts are operating in a warehouse environment 600 with shelving units 610. As illustrated in FIG. 6, because both vehicles are travelling in the recommended direction (indicated by the letter "R"), neither vehicle is slowed-down (indicated by vertical cross-hatching) even though they are within a restricted distance (represented by overlapping circles) of each other.

Figure 7:
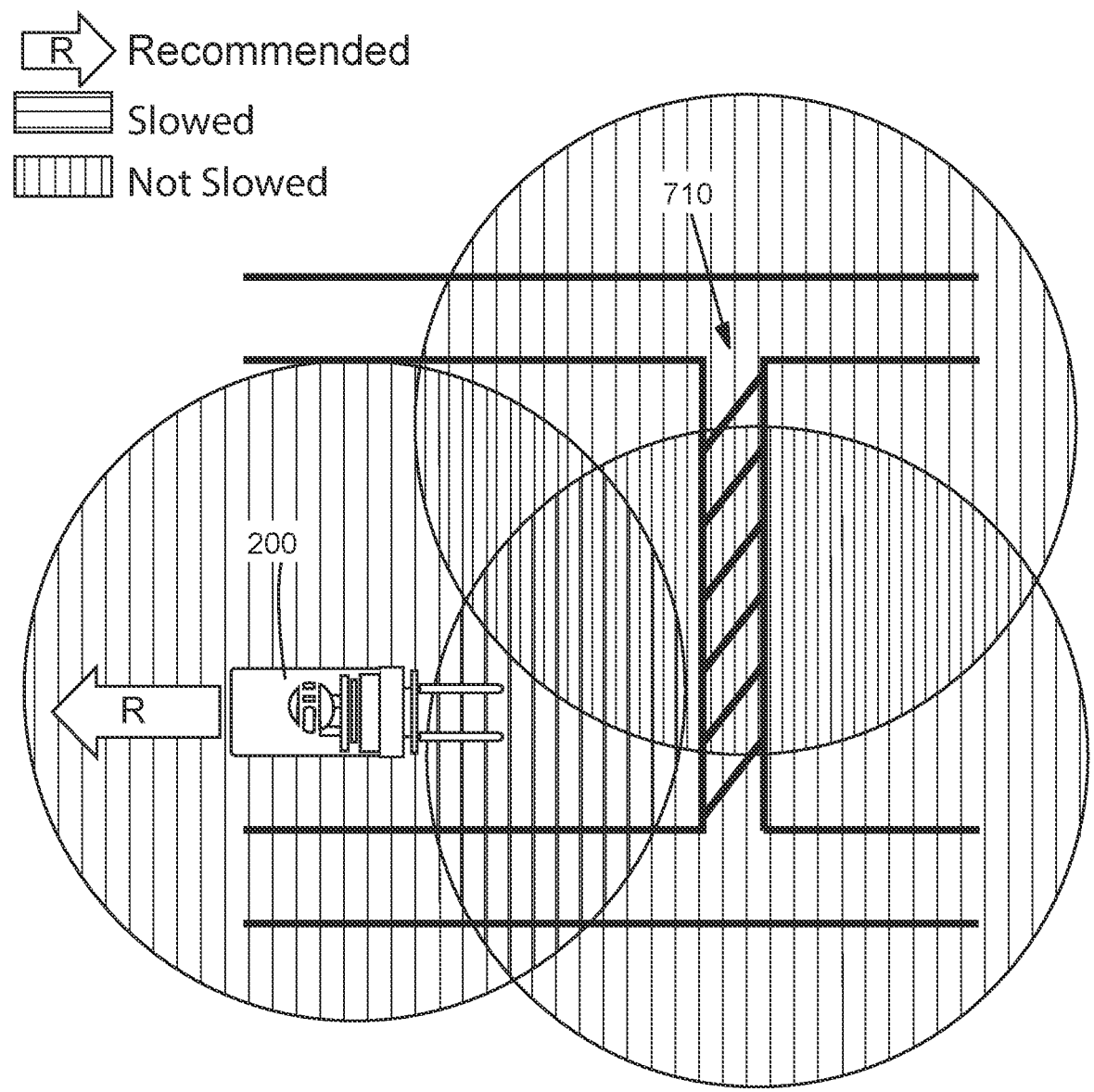
FIG. 7 is a schematic illustration of a T2T-equipped truck driving near a restricted location according to one embodiment of the present invention.

FIG. 7 is a schematic illustration of a T2T-equipped truck 200 driving near a restricted location 710, such as a crosswalk, according to additional principles of the present inventive concepts. Referring specifically to FIG. 7, a T2T-equipped truck 200 having a proximity detection and slow-down system constructed using principles of the present inventive concepts is operating within a restricted location 710. However, because the truck 200 is operating in the recommended direction (indicated by the letter "R"), the automatic slow-down function is disabled and the truck 200 can continue at normal speed (represented by vertical cross-hatching) under the operator's control.

Figure 8:
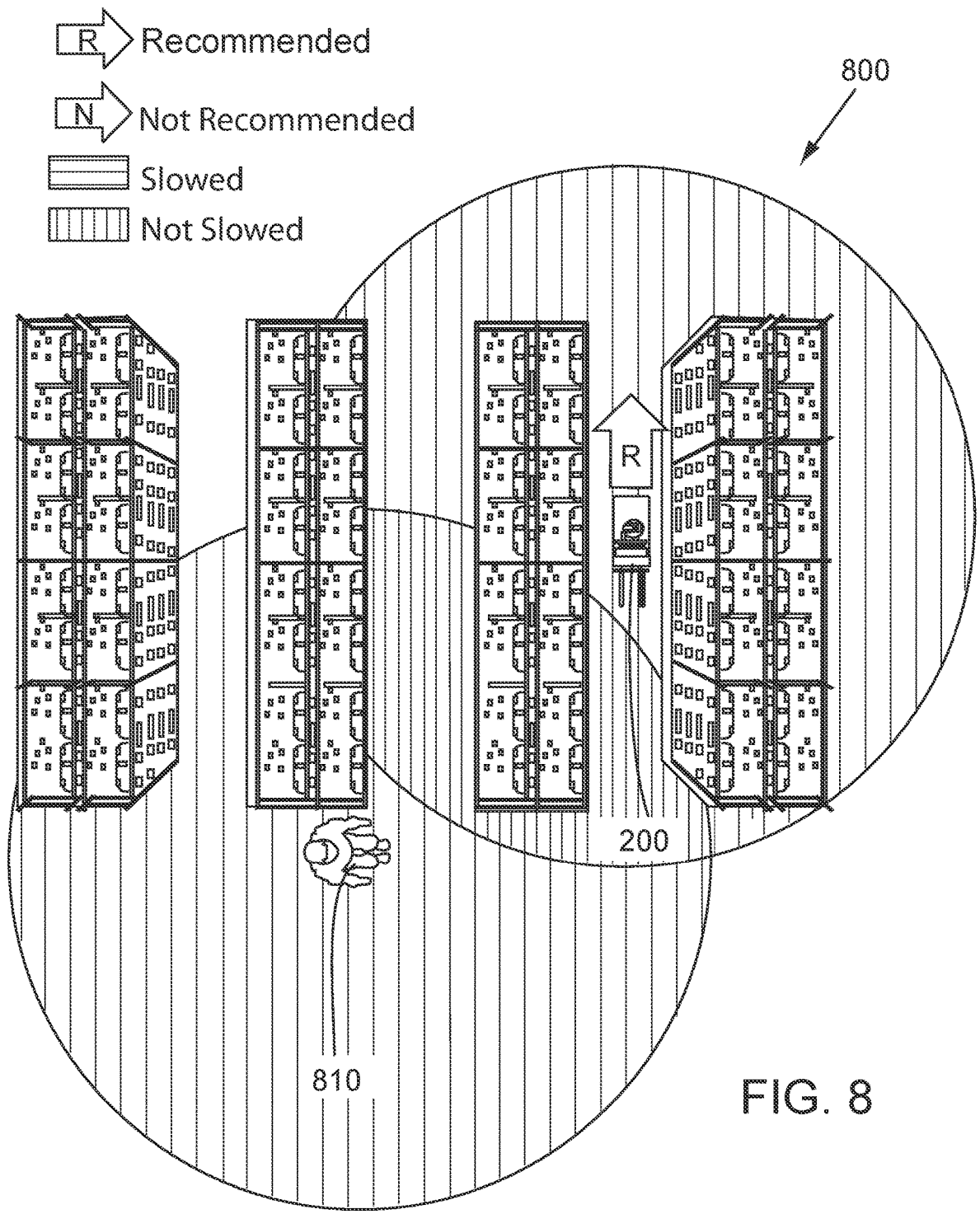
FIG. 8 is a schematic illustration of a T2T-equipped truck driving in a warehouse environment near a tagged pedestrian according to one embodiment of the present invention.

FIG. 8 is a schematic illustration of a T2T-equipped truck 200 driving in a warehouse environment 800 near a tagged pedestrian 810 according to yet other principles of the present inventive concepts. Referring specifically to FIG. 8, a T2T-equipped truck 200 using the proximity detection and slow-down system according to principles of the present inventive concepts is being operated in a warehouse environment 800. As shown, the truck 200 is within a restricted distance of a pedestrian 810 equipped with a UWB tag. Although the conventional system would slow the truck 200 down automatically, the system of the present inventive concepts allows the vehicle 200 to continue to operate at normal speed (indicated by vertical cross-hatching) under the operator's control because the vehicle 200 is travelling in the recommended direction (indicated by the letter "R").

Alternately, or in addition, a T2T-equipped truck 200 may be able to distinguish between UWB tags associated with other trucks from UWB tags associated with pedestrians. With such distinguishing capability, a T2T-equipped truck 200 may continue to operate at normal speed when traveling in the recommended direction and within a restricted distance of another truck, but may be slowed when traveling in the recommended direction and within a restricted distance of a pedestrian. Other distinguishing capabilities may be included for UWB tags associated with intersections, crosswalks, pedestrian walkways, or other suitable areas or items where a vehicle slow-down is desired regardless of travel direction. In addition, the system may be enabled to detect a number of restricted items within close proximity and maintain the slow down function if the number of restricted items in close proximity exceeds a predetermined number (e.g., 3).

Figure 9:
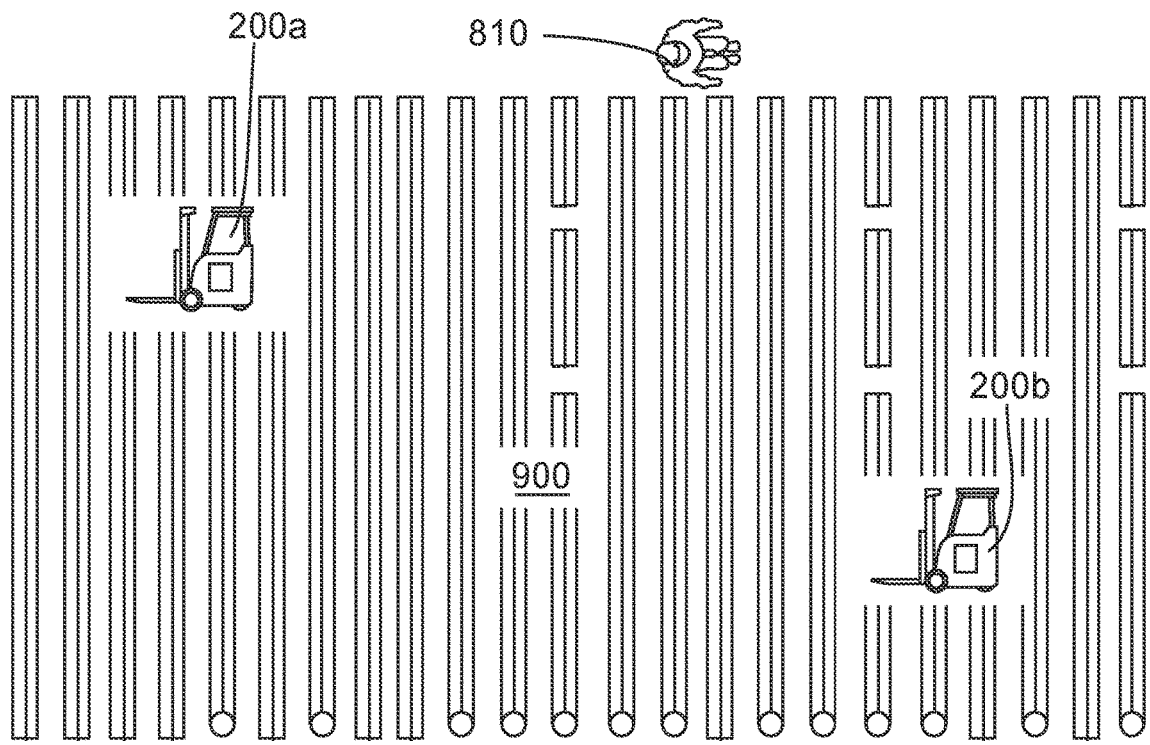
FIG. 9 is a schematic illustration of T2T-equipped trucks and a tagged pedestrian in a warehouse environment utilizing an RTLS system for determining locations according to one embodiment of the present invention.

FIG. 9 is a schematic illustration of T2T-equipped trucks and a tagged pedestrian in a warehouse environment 900 utilizing an RTLS system for determining locations according to still further principles of the present inventive concepts. Referring specifically to FIG. 9, an RTLS system identifies absolute locations of tagged vehicles 200*a*, 200*b*, objects, or pedestrians 810 in real-time. As an alternative (or supplement) to the UWB sensing system explained previously, the RTLS system could be used to identify vehicle 200a, 200b, object, and pedestrian 810 locations and trigger the automatic slow-down function when a truck 200a, 200b is within a restricted distance of a tagged vehicle 200a, 200b, object, or pedestrian 810. According to principles of the present inventive concepts, however, the automatic slow-down function could be disabled when the truck 200a, 200b is travelling in a recommended direction.

Figure 10:
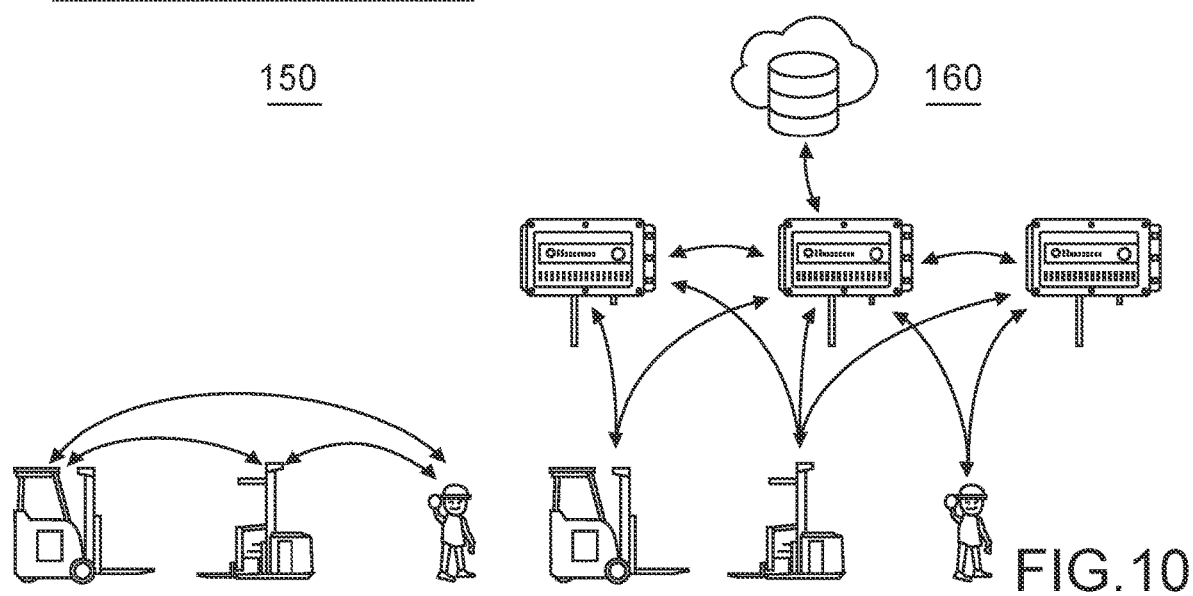
FIG. 10 is a schematic illustration comparing OAS operation in local (e.g., UWB) and RTLS equipped systems according to one embodiment of the present invention.

FIG. 10 is a schematic illustration comparing OAS operation in local (e.g., UWB) and facility-wide (e.g., RTLS) equipped systems according to principles of the present inventive concepts. Referring additionally to FIG. 10, UWB operated systems 150 benefit from lower latency but are much more restricted in terms of the distance between objects they are able to determine. RTLS systems have the advantage of knowing absolute locations of all tagged objects, pedestrians, and vehicles within the facility, but suffer from longer latency times.

Figure 11:
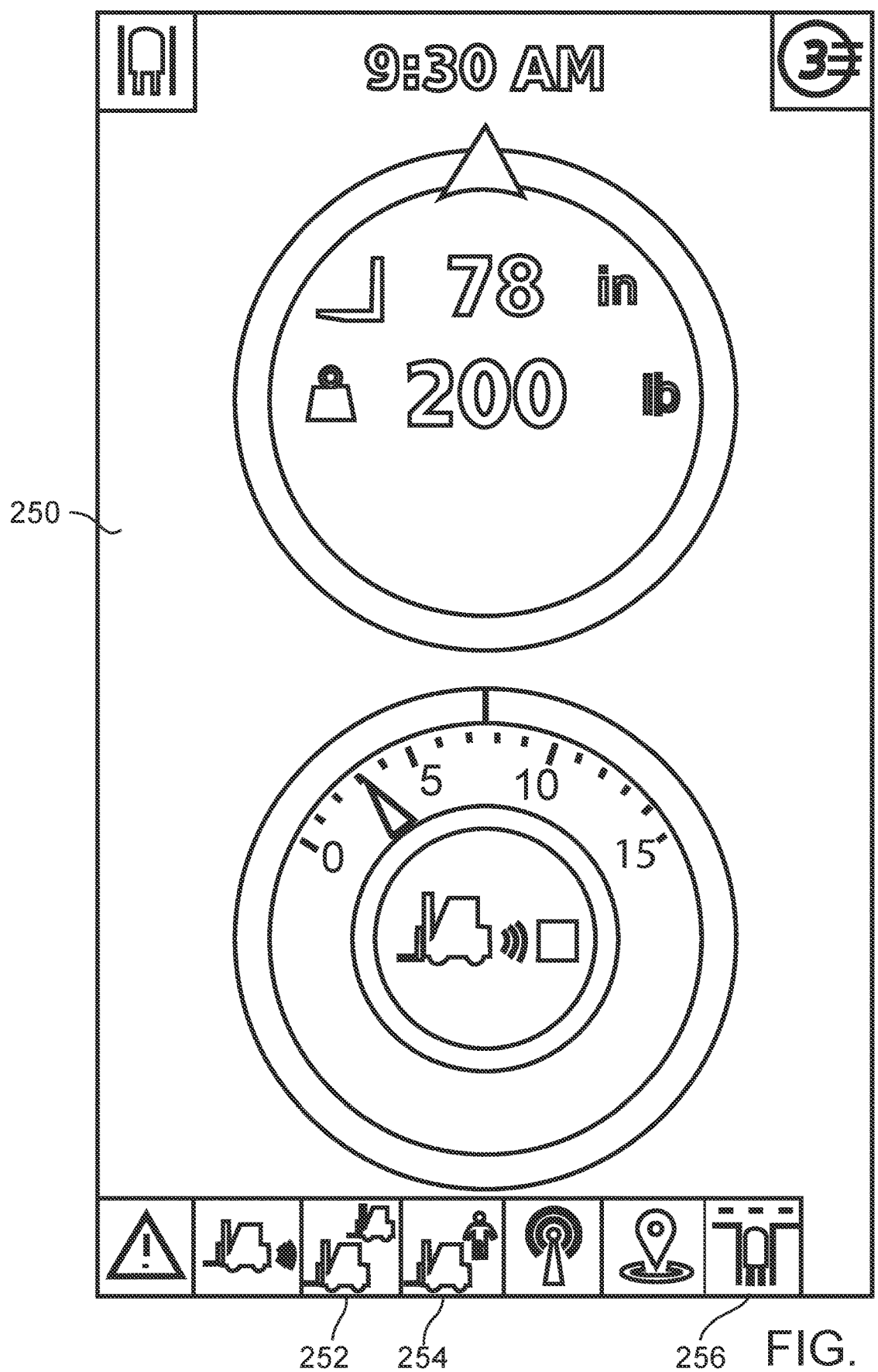
FIG. 11 is a schematic illustration of a display in a T2T-equipped truck according to one embodiment of the present invention.
Figure 6:
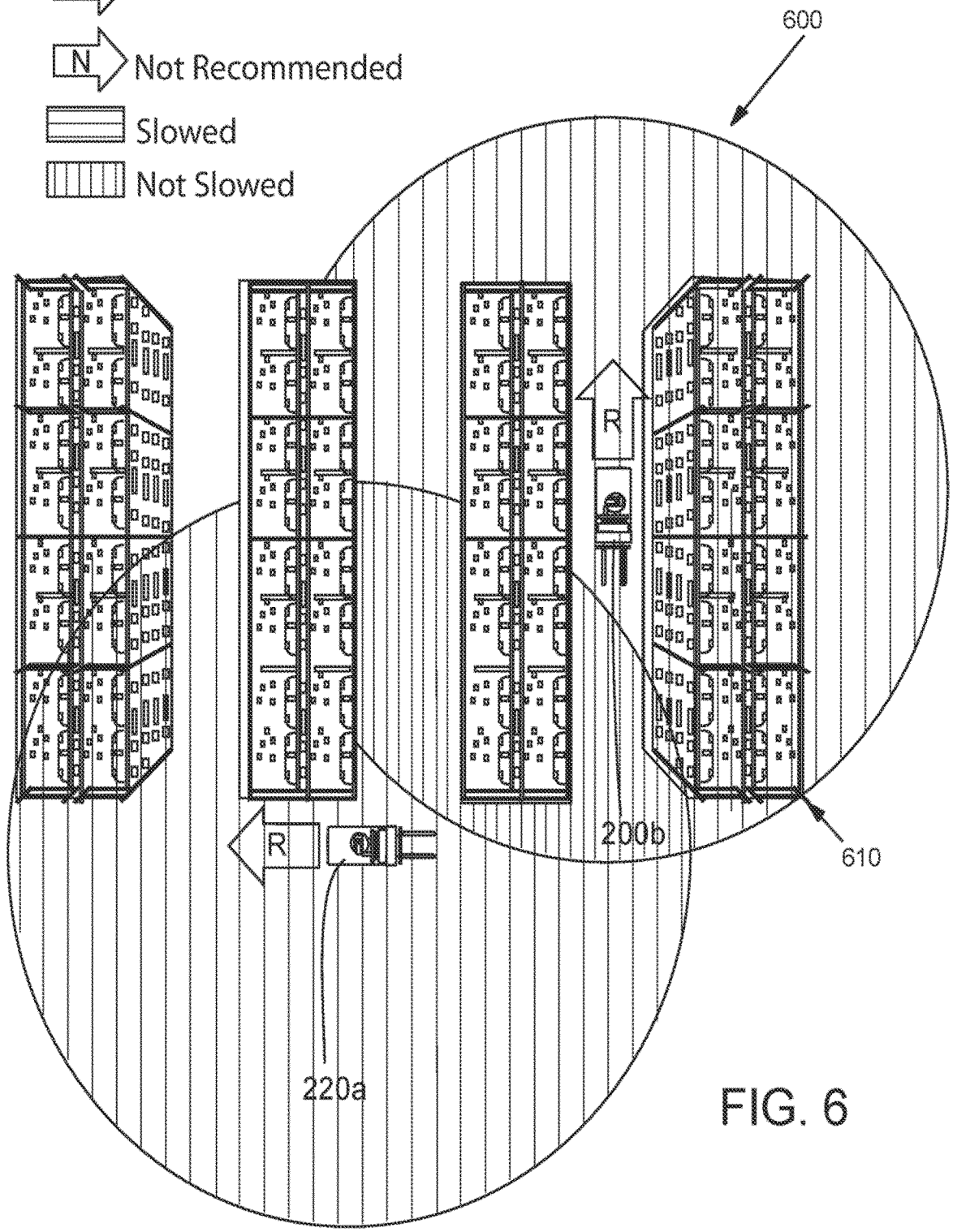

FIG. 11 is a schematic illustration of a display 250 in a T2T-equipped truck 200 according to additional principles of the present inventive concepts. Referring specifically to FIG. 11, a truck display 250 can provide information to an operator regarding the operation of the OAS system. Among other things, this information can include visual warnings regarding proximity to other vehicles (alert symbol 252), pedestrians (alert symbol 254), restricted zones (alert symbol 256) or other objects. Audible warnings could also be provided. Other information regarding loads, fork height, truck speed, whether the truck 200 is driving in the recommended direction, and/or other desired information could also be communicated to the operator using the display 250.

In other embodiments, steer direction (e.g., whether a vehicle is travelling straight or turning, mast height (e.g., whether the forks 210 are raised/lowered and by how much), a load condition, or other factors could be used to determine whether or not to disable the proximity-detection slow down function of the lift truck. For instance, if a truck is travelling straight, regardless of the direction of travel, the slow-down function could be disabled. Alternatively, if the forks are lowered, regardless of the direction of travel, the slow-down function could be disabled. Or if the truck is unloaded, the slow-down function could be disabled regardless of the direction of travel.

In still other embodiments, the slow-down function could be maintained if other predetermined conditions are satisfied. For example, if the truck is determined to be in close proximity to a predetermined number of restricted items (such as multiple vehicles or pedestrians, for example), the slow-down function could be maintained regardless of whether the vehicle is travelling in a recommended direction. The predetermined number could be selected and updated based on customer needs or concerns. Or the system could be configured to maintain the automatic slow-down function whenever a pedestrian (or any other user-selected restricted item) is in close proximity.

CONCLUSION

Various other improvements are also contemplated and numerous variations to the specific designs identified above are possible without departing from the spirit and scope of the inventive concepts. Having described and illustrated principles of the present inventive concepts in various preferred embodiments thereof, it should be apparent that the invention can be modified in arrangement and detail without departing from such principles. In particular, it should be apparent that the systems and methods described herein could be used for vehicles other than lift trucks and for other moving devices.

The terms and descriptions used above are set forth by way of illustration and example only and are not meant as limitations. Those skilled in the art will recognize that many variations, enhancements and modifications of the concepts described herein are possible without departing from the underlying principles of the invention. For example, skilled persons will appreciate that the subject matter of any sentence or paragraph can be combined with subject matter of some or all of the other sentences or paragraphs, except where such combinations are mutually exclusive. The scope of the invention should therefore be determined only by the following claims, claims presented in a continuation patent application, and equivalents to the foregoing claims.

The invention claimed is:

1. A proximity-detection speed-control system for restricting a speed of a materials-handling vehicle, the system comprising:
    a proximity sensor for determining a proximity of the vehicle to another vehicle or to a restricted object, person, or location;
    a recommended direction of travel for the vehicle that is selectable by a user as either a forward or a reverse direction;
    a controller configured to identify a current direction of travel of the vehicle and to determine whether the vehicle is travelling in the recommended direction of travel; and
    a speed controller configured to automatically restrict the vehicle's speed if the proximity sensor determines that the vehicle is within a predetermined distance of another vehicle or restricted object, person, or location, and the controller identifies the vehicle as not travelling in the recommended direction of travel.

2. A proximity-detection speed-control system according to claim 1, wherein the speed controller is disabled if the vehicle is travelling in the recommended direction of travel.

3. A proximity-detection speed-control system according to claim 1, wherein the recommended direction of travel is user-selected based on one or more factors selected from the group comprising: a vehicle type, a load condition, an operating environment, a load type, a mast height, and a vehicle location.

4. A proximity-detection speed-control system according to claim 1, wherein the recommended direction of travel can be changed by the user during operation of the vehicle.

5. A proximity-detection speed-control system according to claim 4, wherein the recommended direction of travel is updated in real-time during operation of the vehicle.

6. A proximity-detection speed-control system according to claim 5, wherein the recommended direction of travel changes depending on a load condition.

7. A proximity-detection speed-control system according to claim 1, wherein an initial recommended direction of travel is selected based on a vehicle type and an operating environment.

8. A proximity-detection speed-control system according to claim 1, wherein the proximity sensor comprises an ultra-wideband (UWB) sensor.

9. A proximity-detection speed-control system according to claim 1, wherein the recommended direction of travel changes depending on a location of the vehicle.

10. A proximity-detection speed-control system according to claim 1, wherein the recommended direction of travel is either a fork-leading or a fork-trailing direction selected based on user preference.

11. A proximity-detection speed-control system according to claim 1, wherein the proximity sensor is directionless.

12. A proximity-detection speed-control system according to claim 1, wherein the speed controller's automatic vehicle speed restriction is selectively enabled or disabled based on one or more predetermined conditions selected from a group comprising: whether the vehicle is turning or travelling straight; whether the forks are raised or lowered; and whether the vehicle is within a predetermined distance of a selected number greater than one of restricted items.

13. A proximity-detection speed-control system according to claim 12, wherein the speed controller's automatic vehicle speed restriction is disabled if the vehicle is travelling straight.

14. A proximity-detection speed-control system according to claim 12, wherein the speed controller's automatic vehicle speed restriction is disabled if the forks are lowered.

15. A method for automatically speed restricting a materials-handling vehicle, the method comprising:
receiving a recommended direction of travel of the vehicle selected between a forward and a reverse direction based on customer preferences;
determining a direction of travel of the vehicle in relation to the selected recommended direction of travel;
sensing the vehicle's proximity to a restricted vehicle, object, person, or location; and
speed restricting the vehicle only if the vehicle is not travelling in the selected recommended direction of travel and the vehicle is within a predetermined distance of a restricted vehicle, object, person, or location.

16. A method according to claim 15, wherein a UWB sensor is used to determine whether the vehicle is within the predetermined distance of a restricted vehicle, object, person, or location.

17. A method according to claim 15, wherein the selected recommended direction of travel is changeable by a customer during operation of the vehicle.

18. A method according to claim 17, wherein the recommended direction of travel is modified during vehicle operation based on one or more factors selected from the group comprising: a load condition, an operating environment, a load type, a mast height, and a vehicle location.

19. A method according to claim 15, further comprising:
receiving, in real-time, a change to the recommended direction of travel.

20. A method according to claim 15, wherein sensing the vehicle's proximity to a restricted vehicle, object, person, or location is accomplished using a directionless sensor.

21. A method according to claim 15, wherein speed restricting the vehicle is selectively enabled or disabled based on one or more predetermined conditions selected from a group comprising: whether the vehicle is turning or travelling straight; whether the forks are raised or lowered; and whether the vehicle is within a predetermined distance of a selected number greater than one of restricted items.

22. A method according to claim 21, wherein speed restricting the vehicle is enabled if the vehicle is within the predetermined distance of two or more restricted items.

23. A method according to claim 21, wherein speed restricting the vehicle is disabled if the vehicle is travelling straight.

24. A method according to claim 21, wherein speed restricting the vehicle is disabled if the forks are lowered.

25. A proximity-detection and speed-control system for a materials-handling vehicle, the system comprising:
a recommended direction of travel for the vehicle selected by a user based on user preferences;
a proximity sensor arranged on the vehicle to detect proximity to a restricted item;
a controller communicating with the proximity sensor to determine when a restricted item is within a predetermined distance;
wherein the controller is configured to determine if the vehicle is travelling in the recommended direction of travel; and
wherein the controller is configured to initiate a slow-down function to restrict a maximum speed of the vehicle if the controller determines that the vehicle is not travelling in the recommended direction of travel and is within the predetermined distance of the restricted item.

26. A system according to claim 25, wherein the slow-down function is selectively enabled or disabled based on one or more predetermined conditions selected from a group comprising: whether the vehicle is turning or travelling straight; whether the forks are raised or lowered; and whether the vehicle is within a predetermined distance of a selected number greater than one of restricted items.

27. A system according to claim 25, wherein the recommended direction of travel can be changed by the user.

28. A system according to claim 27, wherein the recommended direction of travel can be assigned on a location or vehicle-by-vehicle basis.

29. A system according to claim 25, wherein the recommended direction of travel can be changed in real-time.

30. A system according to claim 25, wherein the proximity sensor is a directionless sensor.

* * * * *

UNITED STATES PATENT AND TRADEMARK OFFICE
CERTIFICATE OF CORRECTION

| | |
|---|---|
| PATENT NO. | : 11,661,060 B1 |
| APPLICATION NO. | : 17/858824 |
| DATED | : May 30, 2023 |
| INVENTOR(S) | : Stilwell et al. |

It is certified that error appears in the above-identified patent and that said Letters Patent is hereby corrected as shown below:

In the Drawings

Sheet 6 of 11, "Fig. 5", for Tag "410", Line 2, delete "recomended" and insert --recommended-- therefor.

Please replace Fig. 6 with Fig. 6 as shown on the attached page.

Signed and Sealed this
First Day of October, 2024

*Katherine Kelly Vidal*

Katherine Kelly Vidal
*Director of the United States Patent and Trademark Office*